United States Patent Office 3,535,296
Patented Oct. 20, 1970

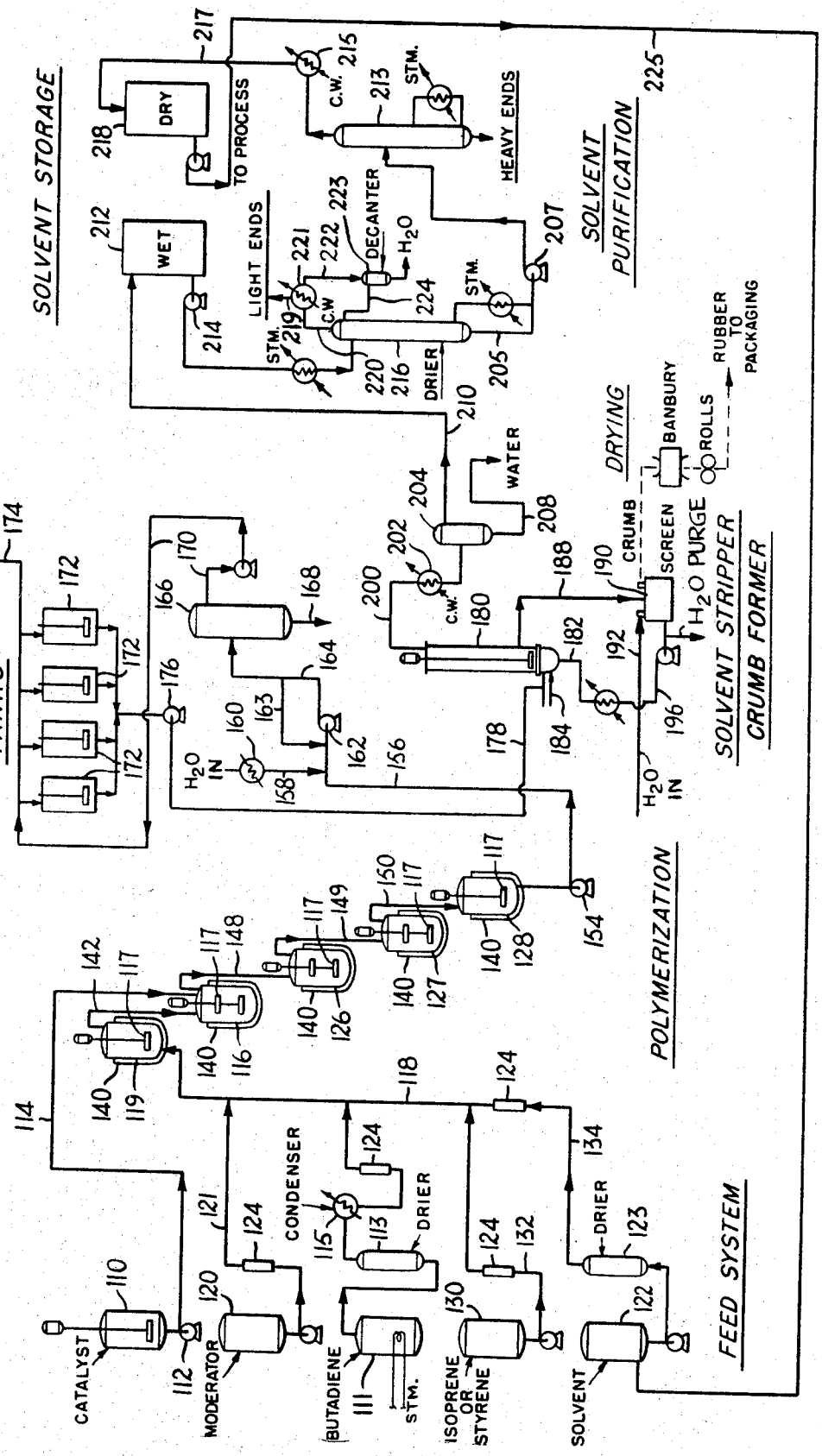

3,535,296
CONTINUOUS PROCESS FOR THE PRODUCTION
OF ALFIN POLYMERS IN CRUMB FORM
Leo H. Broering, Forth Wright, Ky., assignor to National
Distillers and Chemical Corporation, New York, N.Y.,
a corporation of Virginia
Filed Apr. 14, 1969, Ser. No. 815,723
Int. Cl. C08f 1/88, 1/92
U.S. Cl. 260—82.1                              20 Claims

ABSTRACT OF THE DISCLOSURE

A continuous process for the preparation of alfin polymers in crumb form is provided, effecting the polymerization of the monomer by an alfin catalyst in the presence of a molecular weight moderator, separating unreacted monomer, volatile low polymer and solvent by subjecting the alfin polymer reaction mixture to steam stripping in the presence of an anionic poly-(alkylene naphthalene) sulfonate, and thereafter purifying the monomer and solvent and recycling them for reuse, and washing and drying the alfin rubber crumb.

This invention relates to a process for the continuous production of alfin polymers in crumb form, and more particularly to a continuous process for the production of alfin polymers in crumb form from the monomer with recovery and recycling of unreacted monomer and solvent.

Morton and coworkers in a series of papers in the Journal of the American Chemical Society, starting in 1947, describe an organoalkali metal catalyst for the polymerization of olefins and particularly dienes which they term an alfin catalyst, Journal of the American Chemical Society 69 161; 167; 950; 1675; 2224 (1947). The name "alfin" is taken from the use of an *al*cohol and an ole*fin* in their preparation. The alcohol, a methyl n-alkyl carbinol, usually isopropanol, in the form of the sodium salt, the olefin, also in the form of the sodium salt, and an alkali metal halide, form a complex that constitutes the catalyst.

These catalysts are reported by Morton et al. to cause the polymerization of butadiene, isoprene and other dienes, alone and together with other copolymerizable organic compounds, in most cases olefinic in nature. The catalyst was discovered in the course of a study of the addition of organosodium compounds to dienes. Later, on, Morton summarized the work done up until 1950 in Industrial and Engineering Chemistry, 42 1488–1496 (1950).

Exemplary of early interest in the use of alfin catalysts is U.S. Pat. No. 2,592,301, patented Apr. 8, 1952 to Robert G. Linville. Using a batch technique, Linville formed polymers of 1,4-dicyano-2-butene by subjecting the monomer to polymerization conditions in the presence of an alfin catalyst. The polymers were said to be useful as intermediates for the synthesis of polyamines for shrinkproofing wool carboxylic acids, etc.

U.S. Pat. No. 2,606,179 to Boyd, patented Aug. 5, 1952, describes the polymerization of ethylene, using an alfin catalyst in an aliphatic hydrocarbon solvent. The polyethylene produced was said to be distinguished by its clarity, hardness and stability, and had a molecular weight in excess of 20,000.

Foster in U.S. Pat. No. 2,841,574, patented July 1, 1958 claimed that vastly improved results in alfin-type polymerizations can be obtained by using as the solvent certain ethers, acetals, and amines. Foster suggested that the polymerization was effected by an entirely different reaction mechanism than theretofore obtained with alfin catalysts. Foster polymerized propenyl benzene, obtaining a polymer having a molecular weight of about 4500. Polybutadiene was also obtained, but the molecular weight was not given.

The elastomeric polymers obtained from dienes, alone or copolymerized with olifins, using alfin catalysts are termed alfin polymers or alfin rubbers. Because of the speed and ease of the reaction, these attracted considerable interest in the 1940's and early 1950's. However, the very speed of the reaction led to problems. The alfin rubbers have the disadvantage of having an extremely high molecular weight, generally in excess of 3,000,000, and frequently in excess of 10,000,000. As a result, although these polymers are generally gel-free and have high tensile strength, superior abrasion resistance, and tear strength, they are also very tough, and exhibit little breakdown and consequently poor banding on the mill. Therefore, they are difficult if not impossible to process using conventional equipment. Consequently, interest and research in the alfin rubbers until recently was minimal, and in their original form the alfin rubbers have found very little commercial application.

Diem, Pat. No. 2,856,391, patented Oct. 14, 1958, describes alfin type polymerizations obtained using a lithium alkoxide and an alkenyl lithium compound. The polymers were soft, and easily formed into smooth sheets on a rubber mill, in contrast to alfin polymers which required considerable mill breakdown and/or the addition of oils to produce a smooth sheet on the mill, according to Diem.

In all of the above patents, batch techniques were employed to produce the polymers. Batch techniques are however inefficient, and difficult to adapt to a commercial process. Pat. No. 2,606,179 suggests that the system employed could be easily adapted for continuous polymerization, because the polymer settles to the bottom of the reaction vessel and may be drawn off therefrom, but in fact no continuous system is described.

Pat. No. 3,197,448, patented July 27, 1965 to Gavlin, Hedman, and Hubbard, describes the production of elastomers by subjecting propylene and butadiene mixtures to the action of an alfin catalyst. A batch technique is used. There is no reference to a continuous process.

There are many problems in converting the polymerization of alfin rubbers to a continuous operation. It is necessary to control not only the flow of the polymer through the system, but also its molecular weight. To add a "short-stopping agent" or a catalyst deactivator to arrest the polymerization at the desired stage is a serious complication, since the solvent system must be freed from catalyst deactivator, or else it cannot be reused. The polymer that is recovered must be freed from monomer, low polymer such as dimer, solvent, and also catalyst residues. The catalyst (which is a solid) must be kept in a uniform suspension in the reaction mixture throughout the reaction, if polymerization is to be uniform and controllable. At the same time, yield must be optimized, and this is not easy to do while optimizing the other varables, such as solvent recovery.

Accordingly, it is not surprising that when alfin rubbers of relatively low and medium molecular weights, ranging from about 50,000 to about 1,250,000, were provided by Greenberg et al. via U.S. Pat. Nos. 3,067,178 and 3,223,691, all of the preparatory procedures described were batch procedures. There is a reference in the patent to a continuous process, and it is of course possible to visualize the process as a continuous operation, but in fact no details are given in these patents as to how a continuous process in which monomer and solvent are recovered and recycled could be carried out in practice.

The restriction on molecular weight made possible by incorporation of a molecular weight moderator, a dihydroaromatic compound, with the alfin catalyst during the polymerization, for the first time made possible the production of alfin rubbers that were capable of being processed easily, thus avoiding the alternative techniques previously suggested, such as that of Pfau et al. U.S. Pat. Nos. 2,964,083, granted Dec. 13, 1960, and 3,074,902, granted Jan. 22, 1963, who endeavored to reduce working viscosity of the alfin polymers by the incorporation of liquid plasticizers, particularly petroleum hydrocarbon oil. Accordingly, the Greenberg et al., patents have renewed commercial interest in the alfin rubbers, and a commercial development of course, requires a process that would make it possible to prepare such rubbers as a continuous operation.

A continuous process for the preparation of alfin polymers has been provided, comprising continuously blending monomers, alfin catalyst, molecular weight moderator and solvent, continuously effecting the polymerization of the monomer at a temperature at which the reaction proceeds by an alfin catalyst in the presence of the molecular weight moderator, continuously separating unreacted monomer, volatile low polymer and solvent from the alfin polymer reaction mixture by quenching the reaction mixture in water, and steam distilling such volatile materials from the resulting dispersion, thereby forming an alfin rubber crumb, and thereafter recovering the solvent and optionally the monomer and recycling them from reuse, and washing and drying the alfin polymer crumb.

In this continuous process, the molecular weight of the polymer is controlled by adjustment of the proportion of molecular weight moderator. No other modification of reaction conditions, proportions of catalyst, and other process variables is required. A catalyst deactivator and the resultant system contamination complicating recycling of unused material such as monomer and solvent is thus unnecessary, eliminating a serious obstacle heretofore to realization of a continuous process. A further feature of this continuous process is the attainment of any desired Mooney value in the alfin polymer within the range from about 20 to about 150 after the polymerization has achieved about 70% of completion, after which Mooney value does not change appreciably even if the reaction conditions are altered. This enables good control of uniformity of the polymer, and is unlike a batch process. The reason for this is not known, but it permits processing of the alfin polymer without deactivation of the catalyst and without regard to possible alteration in the Mooney value of the polymer. This renders the process extremely attractive for commercial application.

The steam-stripping operation in this process presents special difficulties arising from the unique properties of alfin polymers and alfin catalysts. These polymers contain sodium in the molecule, arising from the alfin catalyst, and in this respect are not similar to polymers prepared using other catalysts. For example, U.S. Pat. No. 3,190,868 to Mitacek et al., dated June 22, 1965, describes a method for recovery of rubbery polymers from solutions thereof in the hydrocarbon solvents in which they were prepared, using organometal catalysts of the Group I, 11 and III; lithium, cobalt, titanium and aluminum are named, but not sodium. Such catalysts lead to formation of polymers that have a tendency to form a sticky crumb that is not dispersed in water. To overcome this, Mitacek et al. add to the aqueous phase a water-soluble derivative of a polymeric substance having a plurality of —COOH groups or precursors of —COOH groups, and a polyvalent metal ion, which is calcium, barium, strontium, aluminum, cobalt, iron or nickel, or mixtures thereof. The reason why a polyvalent metal ion is required is not explained by Mitacek et al., and possibly they did not know; it certainly is not apparent from the patent what the function of the polyvalent metal ion is.

Crouch U.S. Pat. No. 3,042,637, dated July 3, 1962, suggests the addition of alkali metal lignin sulfonates to the steam-stripping zone in which hydrocarbon solvents are separated from rubber solutions. The lignin sulfonate is said to prevent agglomeration of polymer particles and sticking of such particles to the crumb-forming apparatus.

Crouch et al. U.S. Pat No. 3,268,501, dated Aug. 23, 1966, indicates that alkali metal salts of alkyl sulfates or alkylbenzene sulfonates also prevent agglomeration of polymer during steam-stripping. The sulfonate must contain an alkyl group of eight to eighteen carbon atoms to be suitable.

Alfin catalysts are hydrolyzed in water to form highly alkaline solutions, due to formation of alkali metal hydroxide. These solutions have a pH above 10, and usually from 11 to 14. In this respect, they differ from catalyst systems based on metals of Groups III, IV, V or VI of the Periodic Table, which do not form highly alkaline solutions in water, and which are referred to in the Mitacek et al., Crouch and Crouch et al. patents. These patents do not disclose either alfin catalysts or alfin polymers, nor do they suggest applicability of their procedures to these materials.

In accordance with the present invention, it has been determined that alfin polymers can be obtained in the form of discrete, well-formed, non-sticky crumb particles by steam-stripping of the hydrocarbon solvent solutions in which they are formed (by polymerization of diene monomer in the presence of an alfin catalyst) in the presence of an alkali metal salt of an organic anionic poly(alkylene naphthalene) sulfonate surfactant. Polyvalent metal cations are not required, and preferably are not present. The alfin polymerization process is such that polyvalent metal ions are only present in the reaction mixture, if at all, as an impurity, in insignificant amount, and consequently the process of the invention is applied to alfin polymer solutions and slurries that are substantially free from polyvalent metal ions, and in the course of the process polyvalent metal ions are not added thereto.

FIG. 2 represents a flow diagram showing another embodiment of the process, utilizing apparatus for carrying out the washing of the reaction mixture at the conclusion of the polymerization.

Figure 1:
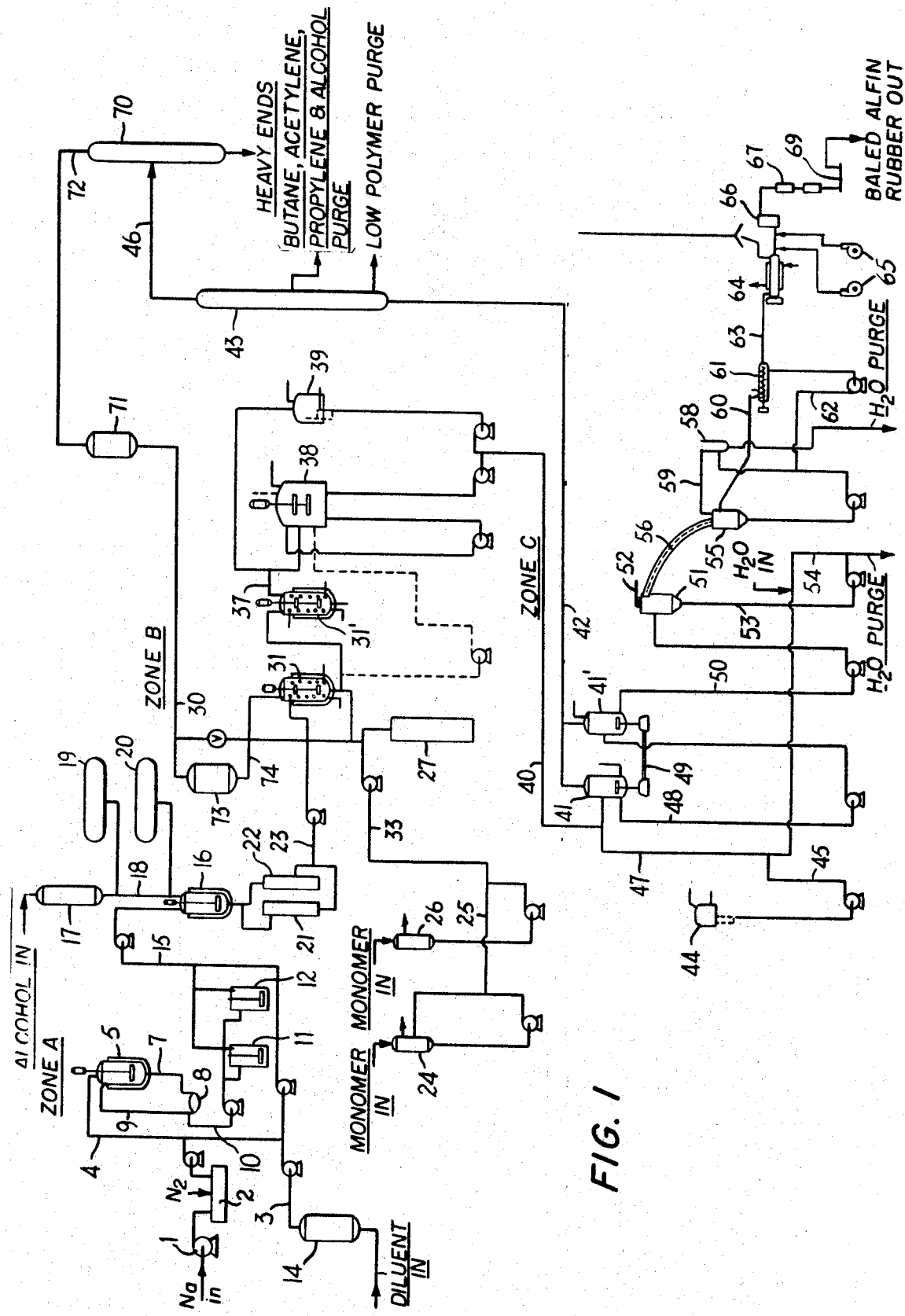
FIG. 1 represents a flow diagram showing the sequence of unit operations involved in a typical apparatus for carrying out the process of the invention.

These unit operations will now be considered in further detail.

ALFIN CATALYST PREPARATION

The linking of the preparation of the sodium slurry used for the alfin catalyst and of the alfin catalyst formation with the alfin polymerization reaction represents an important continuous process of the invention, and provides attractive savings in operation. If in addition the same inert diluent or solvent is employed in the three steps, recovery of the diluent or solvent and recycling at the conclusion of the polymerization are possible without a solvent fractionation step. The recycle solvent after monomer removal, and removal of catalyst alcohol and olefin, and water, can simply be recycled to each of these operations from a common line.

A particularly effective alfin catalyst is obtained when the sodium is employed as a finely-divided dispersion in the inert diluent, in which the maximum sodium particle size is about 1 to 10 microns, such as may be prepared on a Gaulin mill. When such finely-divided sodium is used, ordinary stirring devices may be employed, instead of high speed comminuting equipment, in the preparation of the alfin catalyst. Moreover, catalyst activity can be more readily reproduced.

The amount of sodium in the dispersion is not critical, and can be adjusted to suit any alfin catalyst preparatory procedure that is desired. Usually, a sodium concentration within the range from about 2 to about 50% is satisfactory.

The inert diluent that is employed for dispersion of the sodium can be any liquid aliphatic or cycloaliphatic saturated hydrocarbon. The hydrocarbon should be a liquid under the conditions during which the sodium dispersion and the alfin catalyst are formed. This requires that it remain liquid at temperatures as low as −20° C. and below, and at temperatures as high as 25 to 130° C. or higher, whichever is the maximum temperature reached during alfin catalyst formation.

The satisfactory aliphatic hydrocarbon solvents that are also useful in alfin catalyst preparation and in alfin polymer formation include pentane, hexane, heptane, octane, nonane and decane, 2-methylpropane, 2-methylbutane, 2,3-dimethylbutane; 2-methylpentane; 3-methylpentane, 2,2-dimethylpentane; 2,3-dimethylpentane; 2,4-dimethylpentane; 2,2,4-trimethylpentane; 2-methylhexane; 3-methylhexane; 2,4-dimethylhexane; 2,5-dimethylhexane; 2,2,4 - trimethylhexane; 2,3,4 - trimethylhexane; 3,3,4-trimethylhexane; 2-methylheptane; 3-methylhexane; 2,3-dimethyloctane; 2-methylnonane; 3,4-dimethylnonane; 3-methyldecane; 2-methylundecane; 2-methyldodecane; 2,2,4-trimethyldodecane, etc., and mixtures thereof. While the examples have been listed with respect to the mono-, di-, and trimethyl substituted aliphatic hydrocarbons, it should be appreciated that other lower alkyl-substituted hydrocarbons are considered applicable. Other suitable alkyl radicals include ethyl, isopropyl, butyl, etc. Especially suitable, since they are readily obtainable, are odorless mineral spirits, boiling range 349–406° F., commercial mixtures of branched aliphatic hydrocarbons, such as "Isopar E," a material devoid of normal hydrocarbons, which typically has the composition:

| Component: | Weight percent |
|---|---|
| 2,2,4-trimethylpentane | 2.2 |
| 2,5-dimethylhexane, 2,4-dimethylhexane | 4.8 |
| 2,3,4-trimethylpentane | 11.5 |
| 2,3,3-trimethylpentane | 21.1 |
| 3-methylheptane | 33.0 |
| 2,2,4-trimethylhexane | 6.2 |
| 3-methyl-4-ethylhexane, 3,4-dimethylheptane, 2,3-dimethylheptane, 3,3,4-trimethylhexane | 5.7 |
| 15 other iso-components | 13.7 |
| C$_9$ naphtha+C$_{10+}$ | 1.8 |
| | 100.0 | the C$_6$ hydrocarbon mixture having the following composition:

| Component | Weight percent | Range percent |
|---|---|---|
| 2-methylpentane | 16.2 | 8–33 |
| 3-methylpentane | 15.3 | 14–19 |
| n-Hexane | 49.1 | 38–61 |
| Methylcyclopentane | 17.1 | 5–18 |
| Cyclohexane | 1.4 | 0.2–2 |
| Benzene | 0.1 | <1 |
| Unknown (including propane, butanes, pentanes and toluene) | 0.2 | <1 |
| | 100.0 | 100.0 | and light alkylates which are devoid of n-hydrocarbons, such as Sinclair's "Light Alkylate," which has the following composition:

| Component | Weight percent |
|---|---|
| 2-methylbutane | 10.0 |
| 2,3-dimethylbutane | 8.2 |
| 2,4-dimethylpentane | 5.8 |
| 2,3-dimethylpentane | 7.9 |
| 2,2,4-trimethylpentane | 21.5 |
| 18 other C$_8$ and C$_9$ branched aliphatic hydrocarbons | 46.6 |
| | 100.0 |

Also useful are cycloaliphatic hydrocarbons, such as cyclohexane, cyclopentane, methyl cyclohexane, and cycloheptane.

The sodium dispersion in an inert diluent can be employed in the usual way in any desired preparation of alfin catalyst. Typical preparations of an alfin catalyst have been described in sufficient detail in the Greenberg et al. Pat. Nos. 3,067,187 and 3,223,691 and Hoffman et al. No. 3,317,437, and in the Morton articles supra, so that full details are not required here, and those skilled in the art will know from the following description how to utilize sodium dispersions in accordance with the invention in such preparations.

As the secondary alcohol component, to form the sodium alkoxide, any methyl n-alkyl carbinol having from one to about ten carbon atoms can be used, such as isopropanol, methyl-n-propyl carbinol, and methyl-n-butyl carbinol. Isopropanol is preferred.

The alkoxide will form at rather low temperatures, as low as −20° C. being satisfactory. There is no upper limit on reaction temperature. Consequently, the reaction temperature used is that suitable for metallation of the olefin.

The olefin has from about three to about ten carbon atoms, and should contain the group —CH=CHCH$_2$—. Propylene is preferred, giving allyl sodium, but butene-1, butene-2, pentene-1 and hexene-1 can also be used. Terminal olefins CH$_2$=CH—CH$_2$— are preferred. Activity may decrease as the olefin molecular weight increases.

The alkenyl sodium, sodium halide, and sodium alkoxide composing the alfin catalyst are prepared by reaction of the sodium slurry with the alcohol and the olefin in the presence of the dispersing liquid used for the catalyst. This can be and preferably is the same as the inert diluent used for the sodium dispersion. Frequently, however, if a solvent fractionation step is not inconvenient, a lower-boiling hydrocarbon such as hexane is used, to facilitate separation later. Any inert aliphatic or cycloaliphatic hydrocarbon is satisfactory.

The olefin is metallated by use of an alkyl sodium which is prepared in situ from an alkyl halide having from about three to about ten carbon atoms. Butyl chloride is preferred, but amyl chloride, hexyl chloride, hexyl bromide, heptyl chloride, amyl bromide, and octyl chloride can also be used.

The reaction will proceed at low temperatures, which is advantageous when the olefin is a gas, such as propylene. A temperature from about −20° to about 130° C. can be employed. From one-half to about five hours' reaction time is normally adequate.

The reaction mixture can be prepared by mixing the catalyst diluent, sodium dispersion and alkyl halide, and then adding the alcohol. After the alkoxide has been formed the olefin is added, and metallated. Excess olefin may be removed, and the residue can be used as the alfin catalyst, without further treatment or purification. In this method, the sodium is first converted to the alkyl sodium, and half of this is then converted to the alkoxide, while the remainder is converted to alkenyl sodium.

It is also possible to add the alcohol to the sodium dispersion mixed with the catalyst diluent, forming sodium alkoxide, and then adding the alkyl halide, and finally, the olefin. This procedure requires half the amount of alkyl halide, and three-quarters the amount of sodium, required by the first procedure, and is therefore preferred in a commercial operation.

THE MOLECULAR WEIGHT MODERATOR

The moderator employed for molecular weight control is a dihydro derivative of an aromatic hydrocarbon, as described in the Greenberg et al. Pat. No. 3,067,187.

The dihydro derivatives of aromatic hydrocarbons as embodied herein include 1,4-dihydrobenzene, 1,4-dihydronaphthalene, 1,2 - dihydrobenzene, 1,4 - dihydrotoluene, p-1,4-dihydroxylene, allyl benzene, 1-allyl-naphthalene, 1,2-dimethoxy-4-allyl benzene, 1-methoxy-1,4-dihydrobenzene, 1-phenyl-1,4-dihydrobenzene, 1-ethyl-1,4-dihydrobenzene, and 1-ethoxy-1,4-dihydrobenzene; 4-allyltoluene, 4-allyl anisole, 4-allyl-diphenyl, 1,4-diallyl benzene, chlorobenzene, bromobenzene, iodobenzene, 1-bromonaphthalene, 2-bromonaphthalene, and the like, and mixtures of these. 1,4-dihydrobenzene and 1,4-dihydronaphthalene are preferred.

The amount of moderator controls the molecular weight, and the amount required is dependent upon such factors as the temperature and pressure of the reaction and the quantity and type of diluents employed. In general, it may vary from about 0.1 to about 10%, based on the weight of the monomer, and in the case of the preferred moderators the use of about 0.4 to about 1 percent is preferred.

In the practice of the invention, the process conditions, i.e., temperature, time, catalyst and catalyst concentration, are fixed, and the molecular weight is controlled simply by adjustment of the proportion of molecular weight moderator. Thus, complete molecular weight control is obtained by change in only one variable, and that an easily controlled one. The result is a process that is closely controllable within surprisingly narrow tolerance limits.

Although the mechanism of the action of these moderators in molecular weight control is not yet fully understood, carbon-14 studies have shown that at least one molecule of the moderator is present for each polymer chain, the additional aromatic ring being present presumably as a terminal group. These moderators do not change the ratio of 1,4-trans to 1,2-isomers in the resultant polymers, the ratio in the range of 2 to 3 in normal alfin rubbers being retained.

THE ALFIN MONOMER

The process of the invention can be employed in the alfin polymerization of a wide variety of unsaturated organic compounds, including aliphatic dienes such as 1,3-butadiene, 2,3-dimethyl-1,3-butadiene, isoprene, piperylene, 3-methoxy-1,3-butadiene, aryl olefins, such as styrene, the various alkyl styrenes, p-methoxy-styrene, alpha-methyl-styrene, vinyl naphthalene, and other unsaturated hydrocarbons. 1,3-butadiene alone and combinations of butadiene and styrene and of butadiene and isoprene are preferred polymerizable unsaturated compounds.

THE ALFIN POLYMERIZATION REACTION

Before employing a monomer in accordance with the invention, it is essential that the monomer be prepared for the alfin polymerization by removing any water that may be present and usually at least part if not all of any polymerization inhibitor, particularly any phenols, such as tertiary butyl catechol, since these materials may destroy the alfin catalyst. First, the water is removed from the monomers, such as in a distillation dryer. If the drying tower is operated at 75 p.s.i.g., cooling water may be used for condensation of both the monomers and the water. The water can then be separated from the hydrocarbon monomer layer, which is recycled to the column. The almost dry monomers can be withdrawn from the dryer as a vapor, and condensed again. The monomers are now essentially dry and contain 20 p.p.m. of water or less, together with a few p.p.m. of the inhibitor, tertiary butyl catechol, for example. The monomer can then be withdrawn, leaving behind the inhibitor, which is essentially nonvolatile relative to the monomer, and is ready for feeding to the polymerization reactor system.

The polymerization is effected in the presence of a hydrocarbon diluent or solvent for the monomer, and the alfin rubber, and that is inert in the reaction. Preferred reaction media are inert aliphatic and cycloaliphatic hydrocarbons, such as pentane, hexane, a 1:1 mixture of hexane and pentane, octane, cyclohexane, cyclopentane, cycloheptane, decalin, and heptane. The preferred reaction solvent is the same hydrocarbon employed for the disperson of sodium in the preparation of the alfin catalysts, such as odorless mineral spirits or Isopar E, or commercial hexane or isooctane. Branched chain hydrocarbon solvents tend to give polymers having a lower solution viscosity than straight chain hydrocarbon solvents, and in many cases, consequently, branched chain hydrocarbon solvents are preferred.

The reaction is carried out at an elevated temperature, in contrast to the batch-wise type of reaction described in the Greenberg et al. patent, which employs room temperature or below. Whereas in the Greenberg et al. process the reactants are mixed at a very low temperature, of the order of —10° C., all of the streams of reactants, including catalyst, molecular weight moderator and diluent or solvent, are blended in the continuous operation of the invention at a temperature within the range from about 40 to about 150° F., so as to expedite a rapid attainment of the reaction temperature, in order to facilitate heat removal during the initial stages of the reaction.

The polymerization reaction is carried out in a reaction zone, with the blend of reactants continuously entering at one end, and alfin polymer reaction mixture continuously being withdrawn at another end. The rate of transit through the zone is timed to allow polymerization to proceed at least to 70% of completion at the moderator level employed. This usually requires from about two to about five hours. The polymerization temperature is 40° F. or above, up to approximately 200° F., and preferably within the range from about 120 to about 150° F.

The reaction is exothermic, and after the selected reaction temperature is reached, and reaction is proceeding, the reaction temperature should be controlled by removal of heat liberated in the course of the polymerization. For this purpose, efficient cooling may be needed, with a large surface area exposed to the coolant. The reactors used are provided with coolant systems, such as jackets and cooling coils, through which a coolant can be circulated, such as water.

For more effective control of reaction temperature and hence of the polymerization, a series of reactors can be used. The reactors are operated liquid full, and under pressure, in order to ensure that the reaction is carried out in the liquid phase, in solution or dispersion in the solvent employed. Pressures of from about 1 to about 50 atmospheres are suitable, and higher pressures, up to 300 atmospheres, can be used.

Another important feature of the polymerization is the use of a relatively dilute solution of the reactants. In the batch-wise reaction of the Greenberg et al. patent, for example, a 30% butadiene solution is employed in hexane in Example 1, and a 96% yield of polybutadiene was obtained in this system. On the other hand, in the continuous operation of the process, the effluent from the polymerization reaction system should contain a maximum of 25 weight percent of alfin rubber and preferably from about 8 to about 12 weight percent rubber at the reaction temperature, before solvent removal. As little as 5 weight percent of alfin rubber is satisfactory and even 2% can be handled, but of course as the solution becomes more dilute the volumes of solvent being cycled become rather large for the weight of polymer being produced, and efficiency goes down. The olefin and/or diene monomer starting material concentration is adjusted accordingly, and is also at most 15 weight percent, and preferably from about 10 to about 12 weight.

The amount of alfin catalyst (solids basis) that is employed is normally from about 1 to about 5 weight percent, and preferably from about 1 to about 3.5 weight percent based on the weight of the unsaturated organic compound.

As indicated previously, it is quite important that water be excluded from the alfin polymerization reaction mixture, and consequently it is essential that all components that are employed therein be anhydrous.

The polymerization reaction is carried out under such conditions that approximately 80 to 95% of the diene and/or olefin monomers entering is polymerized. Control of molecular weight and hence of Mooney of the polymer is effected by the amount of the molecular weight moderator that is added. The polymerization product is obtained as a solution in the solvent of the alfin rubber, and this solution of the alfin rubber is referred to as alfin rubber cement.

At the conclusion of the polymerization reaction, an antioxidant can be added, as a preservative for the alfin rubber during subsequent processing. A very small amount of the antioxidant will be effective. An amount within the range from about 0.1 to about 5% by weight of the alfin polymer will suffice. As the antioxidant, there can be employed any organic phenol, organic amine, or aminophenol, such as, for example, 2,2'-methylene-bis (4-methyl-6-tertiary-butyl-phenol) or N-phenyl-2-naphthylamine.

The moderator is used in an amount to give the desired molecular weight. It has been determined that after the desired molecular weight is reached in the continuous process of the invention, it is quite unnecessary to arrest the polymerization. The moderator gives sufficient protection. In fact, to add compounds such as ethanol for the purpose is undesirable, because this will contaminate the solvent system, and since it can poison the alfin catalyst it must be removed before the solvent can be recycled.

REMOVAL OF VOLATILES INCLUDING MONOMER AND SOLVENT AND FORMATION OF ALFIN POLYMER CRUMB

In this step, the alfin polymer is recovered as crumb from the reaction mixture, and any volatile materials are removed by flashing and a simultaneous steam stripping. The operation is carried out continuously in the presence of hot water, to hydrolyze any sodium acetylide and sodium cyclopentadiene. Volatile low polymer is also stripped. The alfin catalyst is hydrolyzed, and any olefin and alcohol released therefrom are removed as well, at this stage.

As the first stage in the steam-stripping, the alfin polymer solvent solution withdrawn at the end of the polymerization zone is blended with hot water in the presence of an alkali metal salt of an organic anionic polymethlyene naphthalene sulfonate surfactant. The water is preferably at a temperature above the steam distillation temperature of the solvent or diluent to be stripped. This temperature will also be above the boiling point of monomer, catalyst alcohol and catalyst olefin. The water is held at this temperature (inasmuch as the alfin polymer reaction solution is continuously being blended therewith in a crumb former or solvent stripper) by injection of steam. Thus, a true steam distillation of the volatiles is obtained in combination with a very rapid flashing of volatiles, due to the heat of the water when the water and reaction solution are blended. The alfin polymer precipitates from the polymer solution as a wet finely divided crumb, and becomes suspended in the water in this form.

The amount of water used is enough to form an alfin polymer crumb suspension containing from about 2 to about 10 weight percent crumb. The maximum crumb content is determined by the handling properties of the suspension.

The alfin catalyst is hydrolyzed by the water, forming the alcohol and olefin from which the catalyst was originally prepared, and alkali metal hydroxide. The amount of alkali is not large, but it is sufficient to bring the pH of the resulting slurry to at least 10, and usually from 11 to 14, greatly complicating the obtention of an alfin rubber crumb of good quality.

The alfin polymer reaction solution is blended with the hot water continuously, and the volatiles are continuously drawn off overhead while the alfin rubber crumb that becomes suspended in the water is continuously separated by screening or centrifuging. The solution can be blended with the water at one end of this zone, and the crumb removed at another end. One or several stages can be used, depending on equipment limitations. Conventional crumb formers or solvent strippers as used in the synthetic rubber industry are suitable.

The surfactant can be added to the alfin polymer reaction solution, to the hot water, or to the blend thereof. It can also be blended with the recycle water, or the make-up water and steam. The surfactant ensures formation of discrete well-formed, hard or non-sticky crumb particles that can be readily processed in the crumb-forming or solvent-stripping and in subsequent crumb-dewatering and crumb-drying steps.

The suspension of cement in water simultaneously is subjected to steam stripping. Steam distillation is effected at a temperature within the range from about 50 to about 120° C., as a result of which the suspension can be brought to the boiling point of water. Any volatiles that are not flashed off are steam distilled out.

The steam stripping step is normally carried out under atmospheric pressure. However, it may be desirable to employ sub or super atmospheric pressures, in order to achieve lower or higher stripping temperatures, and good crumb formation.

The time required to remove all volatiles depends to some extent on the amount and type of volatiles and the physical characteristics of the alfin polymer being processed. Usually, from about 2 to about 90 minutes are adequate. For example, an alfin copolymer of butadiene and styrene, containing from about 75 to about 98 weight percent of butadiene, can be recovered from solution in hexane wherein the polymer concentration is about 10%, as an essentially solvent free rubber crumb, that is, containing less than about 0.5% hexane, by steam stripping at a temperature of from about 200 to about 210° F. for about 3 minutes to a half-hour.

If desired, as an alternative procedure, the alfin polymer reaction solution can first be subjected to a continuous water-washing treatment, preferably passing the reaction solution and the wash water countercurrently to each other, thereby removing alcohol and water-soluble salts, and facilitating the production of a polymer having an extremely low ash content. The washing step is not necessary in most cases, however. If it is used, it can be carried out by passing the alfin polymer solution and water countercurrently, and passing the wet polymer solution to a separation zone, where the water separates out as an aqueous phase containing water-soluble impurities, leaving the alfin polymer solution. The alfin polymer solution is then passed to the steam stripping zone.

In a variation of the washing step, in order to ensure a substantially complete removal of water-soluble impurities from the polymer-solvent solution, a two stage or plural stage countercurrent washing can be used.

The volatiles overhead, including monomer, solvent, alcohol, olefin, moderator and water, are drawn off together. The solvent is separated from the monomer, alcohol and olefin by the usual condensation and fractionation techniques, and recycled to the polymerization state. The monomer can be recovered and recycled, if desired. All are dried before recycling.

THE ALKALI METAL SALT OF THE ORGANIC ANIONIC POLY(ALKYLENE NAPHTHALENE) SULFONATE

The organic anionic surfactant is characterized by a mixed hydrophobic-hydrophilic character, arising from the presence of a hydrophobic portion of relatively high molecular weight, the poly(alkylene naphthalene) chain, and —$SO_3M$ groups (M is an alkali metal), attached to the hydrophobic poly(alkylene naphthalene) portion. The —$SO_3M$ group is in the form of the alkali metal (sodium or potassium) salt. The ammonium salts can be used; these form the sodium salts in situ, upon liberation of sodium hydroxide from the alfin polymer and alfin catalyst in the presence of water; ammonia may be liberated, and driven off with the volatiles.

These poly(alkylene naphthalene) sulfonates contain a polymeric chain of a molecular weight from upwards of 100 to 10,000 or more, preferably from 500 to 5,000, bearing naphthalene rings as an integral part of the chain or as side groups. The naphthalene units are linked in the polymeric chain by linking groups, having from one to four carbon atoms, such as poly(methylene naphthalene), poly(ethylene naphthalene), poly(propylene naphthalene) or poly(isobutylene naphthalene) units.

Exemplary surfactants are the sodium poly(propylene naphthalene) sulfonates, sodium poly(ethylene naphthalene) sulfonates, sodium poly(methylene naphthalene) sulfonates, sodium polyisopropylene naphthalene sulfonate, and sodium keryl poly(butylene naphthalene) sulfonate.

The potassium salts of these surfactants can also be used, but are more expensive. Ammonium salts can be used, and will form the sodium salts in situ; so also will the free acid form of these surfactants.

The anionic surfactant can be used in an amount within the range from about 0.05 to about 2% by weight of the alfin polymer. Preferably, from about 0.25 to about 0.5% is used.

CRUMB SEPARATION AND FINISHING

The purpose of this treatment is to dry the alfin rubber crumb, which at this stage may still contain small amounts of the solvent, molecular weight modifier, and any relatively nonvolatile monomer, such as styrene.

The rubber crumb is first separated by running the suspension through a screen. The use of cold water as a wash for the crumb cake will cool the crumb, and prevent its sticking to the screen. The water wash may also leach out any residual surfactant and water-soluble salts present in the crumb. The alfin polymer crumb from the screen may then be brought to an expeller, which by means of screw compression reduces the water content to below 15%. The remaining water and any solvent can be removed by flashing, compressing the rubber in an expander, so as to heat it, and then releasing the pressure suddenly so that water as steam and solvent flash off. The water is separated, and some is recycled, while some is purged, since this wash water contains salts and build up of salts must be avoided. The final product from the expander can be baled, and is ready for distribution and/or use.

THE CONTINUOUS SYSTEM OF FIG. 1

FIG. 1 shows a system in which the continuous process for preparing alfin rubbers in accordance with the invention is carried out in the production of alfin rubbers from butadiene, isoprene and styrene, separately or in any combination.

The synthesis of the alfin catalyst in this system takes place in Zone A. The process shown employs sodium, which is prepared as a dispersion in a liquid diluent at a 25 to 50 weight percent sodium concentration. The molten sodium is fed via pump 1 to the storage tank 2 where it is stored under nitrogen. Diluent enters via line 3 and sodium (molten) via line 4 into the mixing tank 5, whence it is circulated via line 7 to a Gaulin mill 8 to reduce the particle size of the sodium, and then back via line 9 to the mixing tank, to provide an intimate dispersion of sodium of a particle size of less than 10 microns average diameter in the diluent. The finished dispersion is bled off continuously via line 10 to one of two storage tanks 11, 12, equipped with agitators to maintain uniformity.

To prepare the alfin catalyst, a batch technique is used. Diluent from storage 14 is charged via line 15 to the catalyst synthesis reactor 16, an agitated vessel equipped with cooling facilities. Sodium dispersion is added via line 15 from tanks 11 or 12, and isopropyl alcohol is gradually added from storage 17, via line 18 with agitation and cooling at a temperature of approximately 0 to 80° C. Since the reaction is exothermic, the alcohol addition is slow. In this way, one-third of the sodium is converted to sodium isopropoxide. The addition of butyl chloride from storage 19 via line 18 then converts most of the remaining sodium in the tank 16 to equimolar quantities of sodium butyl and sodium chloride. This also is an exothermic reaction and cooling is required. The temperature is held within the range from about 0 to about 80° C.

After the addition of butyl chloride is complete, the reaction is allowed to proceed to completion, with agitation. Propylene from storage 20 is then added directly via line 18 to the liquid contents of the vessel. This addition converts sodium butyl to sodium allyl, with the formation of butane as a by-product. Very little heat is evolved at this point, and the reactor is kept under the pressure of the propylene solution. The pressure at this point should be less than 15 p.s.i.g. The contents of the reactor are held at this temperature for several hours, and the pressure then reduced to atmospheric by venting. Butane and excess propylene may be partially removed by heating. The contents then are transferred to one of two catalyst storage tanks 21, 22. Each storage tank holds approximately a one day supply of catalyst for use in the continuous process of the invention.

The catalyst preparation can be converted to a continuous operation by providing three catalyst reactors in series, in which each step of the catalyst preparation is carried out in sequence.

Catalyst suspension is supplied to the polymerizers continuously from one of tanks 21, 22 via line 23. The tanks are equipped with agitators to avoid settling of the solids.

The alfin monomer polymerization process takes place in Zone B. The process will be described for preparing a butadiene-isoprene rubber. Monomer feed is prepared for use in the polymerization by removing water and any inhibitor in the strippers 24, 26 from butadiene and isoprene, since these substances destroy catalyst. The preparation of a butadiene-styrene rubber is similar, except that only the butadiene is dried. The dry monomers are fed via lines 25, 33 to the first polymerization reactor 31. Dry moderator is stored in tank 27.

The polymerization is carried out by passing recycle stream 30 consisting essentially of iso-octane and some recycled butane and butadiene to the first of six polymerizer reactors 31, 31' (only two are shown). Dry moderator from tank 27 and fresh dry monomer in line 33 are mixed with the recycle in the desired proportions and charged together to the polymerizer. Catalyst is injected separately via line 23. Since the reaction is exothermic, heat must be removed.

A plurality of polymerizer reactors 31, connected in series, in this case, six, is normally used. These are each jacketed, and contain cooling coils. The coolant is water, or other suitable liquid. The reaction temperature is within the range from about 100 to 200° F. The first reactor is expected under proper conditions of operation to be at the lowest temperature, because of the cooling effect of the large mass of solvent entering. A higher temperature is maintained in the second through the fourth stages. The last two stages, because of the lower degrees of conversion, do not require as much cooling. All polymerizers are operated liquid full.

The maximum polymerization pressure is that needed to ensure adequate pressure containment in the event of an upset, and also to ensure sufficient pressure for the reactor effluent to flow to the alfin cement blend and feed tanks.

The polymerizer effluent from the last reactor 31' flows via line 37 to either the alfin element blend tank 38 or to the concentrator feed tank 39. Anionic surfactant and optionally nonionic surfactant as well are added at tank 38 or tank 39, depending on which is in use.

During normal operation, when product of the proper Mooney is being made, the flow will be directly to the feed tank 39. Blending to the desired Mooney level can be obtained by mixing alfin cement from various storage tanks in the blend tank 38.

Alfin cement of the desired Mooney is fed via line 40 to the first of two solvent strippers or crumb formers 41, 41'. Approximately 95% of the total solvent is removed in the first solvent stripper, and substantially all of the residual unreacted butadiene and isoprene are recovered. The combined vapor system from the solvent strippers flows to a condenser fractionator and is thence recycled.

The crumb formation and finishing operations take place in Zone C. These are the same whether an isoprene or styrene rubber is made. The isoprene rubber case is described.

Rubber cement for example containing approximately 10 to 12 weight percent rubber is continuously charged to the first of two solvent strippers 41, 41'. It is mixed with hot recycled water entering via line 47 so that a suspension of alfin cement in water results. A dilute solution of poly(methylene naphthalene) sulfonate (Tamol SN) surfactant is added from storage 44 via line 45. The resultant mixture enters the solvent stripper 41, a vessel equipped with a stirrer and overhead collection line 42 running to condenser-fractionator 43. The water is hot enough to flash some of the solvent. Steam is injected via line 49 to effect a steam distillation, and heat the mixture to a temperature of about 205° F., while the mixture is stirred. Solvent vapors escape via line 42. An aqueous slurry of alfin rubber crumb results, having a pH of 12, and the crumb is in the form of discrete, well-formed, hard particles, due to the presence of the surfactant. The rubbery slurry is removed from below and is sent to the second stage solvent stripper 41', which is similar to the first stage. Most of the solvent is removed in the first stage, and the rubber entering the second stage has, for example, a solvent content of the order of 5 to 10 weight percent, based on the alfin rubber content.

Stripper 41' operates at a temperature of approximately 212° F. Steam is also injected directly into this vessel via line 49. An aqueous slurry of alfin rubber of the order of 2 to 6 weight percent rubber is withdrawn via line 50. The solvent content of the rubber at this point is of the order of 1 weight percent, based on the alfin rubber.

The product vapor stream in line 42 contains essentially all the hydrocarbons that were present with the exception of the rubber. In addition, it contains propylene, formed by decomposition of the catalyst with water to form sodium hydroxide. It also contains isopropyl alcohol, formed by hydrolysis of the sodium isopropoxide. The rubber crumb contains small quantities of the moderator dihydronaphthalene, styrene (if present), as well as a small amount of solvent. The quantity of solvent in the crumb at this stage should be kept to a minimum by appropriate adjustment of the steam stripping conditions.

The slurry from line 50 enters a separator 51 equipped with a mechanical rake 52, so that rubber crumb which floats to the surface of this vessel can be skimmed off. The water in the lower portion of this vessel, relatively free of rubber crumb, is recycled to stripper 41 via lines 53, 54, 47. In addition, to prevent buildup of salts, a proportion is purged, and replaced by make-up water which enters at line 54.

The rubber crumb which is present in the form of small particles and contains approximately 60 weight percent water and which is raked out enters a dewatering screen separator 55 via a chute 56. In the chute, the rubber crumb is contacted with a stream of cold water which cools the crumb and prevents clogging of the dewatering screen. The addition of water at this point also reduces the salt content of the rubber crumb. The underflow from the screen consists essentially of water containing a small amount of rubber fines, and is withdrawn and pumped to a secondary fines settler 58. Rubber crumb is allowed to overflow from the upper portion of this vessel, and passes via line 59 back on to the screen separator 55. The underflow consists of water containing dissolved salts, and is purged.

The alfin rubber crumb discharged from the separator 55 is fed by conveyor 60 to an expeller 61. The expeller by means of screw compression reduces the water content from approximately 60% to below approximately 15 weight percent. The water discharged from the expeller is returned to the fines settler 58, via line 62. The rubber from the expeller passes through line 63 and enters an expander 64. Here, by compression, and jacket-heating, the rubber is heated, so that upon discharge water as steam and solvent flash off. A stream of hot purge air to carry away water vapors and any solvent to prevent condensation in the crumb is provided by blowers 65. The alfin rubber at this point in the form of crumb is conveyed to a crumb conveyor and cooler 66 and subsequently to a baler 67 where it can be packaged in 75 pound bales. These are conveyed via conveyor 69 to storage. The solvent and other volatiles removed at the expander are vented.

The solvent recovery and purification fractionator 43 is designed (1) to recover the monomers and solvent, and (2) to purge the system of butane, acetylene, alcohol, and propylene. The overhead from the fractionator 43 is led via line 46 to the heavy ends tower 70. Butadiene dimer and moderator, also present in the vapor stream from the crumb formers, and styrene, if present, are separated in the heavy ends tower 70 from which the solvent and monomer are removed overhead and passed to the dryer 71 via line 72 after which they are recycled via line 30 to the solvent storage tank 73, whence they can be sent via line 74 to the polymerizers, if desired. If pure solvent is required, for use in the catalyst synthesis or sodium dispersion or in the polymerizers, monomer can be removed by a fractionation step.

The equipment described can be designed to produce 20,000 up to 100,000 or more long tons per year of alfin rubber on a 100% gum basis. This can be polybutadiene, butadiene-isoprene copolymer, butadiene-styrene copolymer or polyisoprene. The butadiene-isoprene copolymer can be approximately 60 to 98% butadiene and 40 to 2% isoprene. The styrene rubber can be approximately 70 to 98% butadiene, and 30 to 2% styrene. The rubber has a Mooney range of 20 to 150.

THE CONTINUOUS SYSTEM OF FIG. 2

In the apparatus of FIG. 2, alfin catalyst in the form of a solvent slurry, e.g. a hexane slurry, is passed from catalyst feed tank 110 through pump 112 and line 114 to below the surface of the liquid in reactor 116, first of a group of four reactors 116, 126, 127, 128 each equipped with a stirrer 117. Simultaneously with the addition of the catalyst to reactor 116, butadiene is distilled from tank 111 through a molecular sieve drier 113 and thence condensed in condenser 115, and passed into line 118 leading to the mixing tank 119. Simultaneously with this addition, there are also introduced into the mixing tank 119 a molecular weight moderator, e.g., 1,4-dihydronaphthalene from feed tank 120 through line 121, isoprene or styrene from feed tank 130 through line 132, and hexane solvent from tank 122 via drier 123 through line 134. In the case of all feeds to tank 119, there are provided in the feed lines rotameters 124 to regulate the feed rate of each component, thus making adjustable the monomer ratio, the molecular weight of the polymer formed and the concentration of polymer in solution.

Reference numeral 140 denotes the jacket surrounding each reactor through which water or other coolant may be circulated to maintain the reaction temperature, preferably at about 120 to about 180° F., although higher or lower temperatures, e.g. 100° to 200° F. can be used.

Reaction mixture composed of solvent (hexane), unreacted monomers, and moderator is passed by gravity from tank 118 through overflow pipe 142 to the first reactor 116, where catalyst is added and polymerization begins. The reaction mixture passes through overflow pipe 148 to a second reactor 126, thence via line 149 to the third reactor 127, and thence via line 150 to the fourth reactor 128. Four reactors are utilized herein to provide adequate retention time for the polymerization process, and control heat liberated during the reaction. The first three reactors are run liquid full.

If desired, the process could be conducted in a single reactor, designed to give the desired retention time, although it is believed preferable to utilize at least two reactors, to provide for effective heat removal, to permit more complete reaction, and to obviate the need for recovering unreacted monomers.

The stirrers 117 preferably are of the variable speed, turbine type, whereby speed may be adjusted to give good agitation consistent with the viscosity of the polymer.

Retention time in the four reactors shown may vary considerably, depending upon the nature of the desired polymer. In many cases it has been found that retention time in each reactor of thirty minutes to one hour is entirely suitable, although retention time may be extended to as much as six to eight hours per reactor.

Alfin polymer solution is withdrawn from the bottom of the last reactor 128 and is fed by pump 154 driven by a variable speed motor (not shown) through line 156 to centrifugal wash pump 162, which is employed for the washing operation. Water to be utilized to remove water-soluble salts, isopropanol, and other impurities from the polymer solution is passed through line 158 and a heat exchanger 160 to line 156 from which it enters the centrifugal wash pump 162 together with polymer solution from the reactors. The temperature of the water and organic streams may vary over a considerable range, e.g. fom 32° F. to the boiling point of the lowest boiling constituent of the organic phase. However, a system temperature of 120 to 150° F. is preferred. In centrifugal wash pump 162 a temporary emulsion of the water and organic phases is formed, and thence passed through line 164 to a decanter 166 where the heavier water phase containing the water-soluble salts, isopropanol, and other impurities is discharged to waste through line 168, while the lighter organic phase containing the salt-free product is discharged through line 170 to any one of four product solution surge tanks 172. Numeral 163 denotes a recirculation conduit for recirculating aqueous and organic liquid through the centrifugal wash pump 162. If desired, antioxidant may be added to the product at this stage in the operation through line 174.

From surge tanks 172 the polymer solution is fed by pump 176 through line 178 to a solvent stripper 180.

Hot water containing anionic poly(methylene naphthalene) sulfonate (Tamol SN) surfactant, and steam are passed into the solvent stripper 180 through lines 182 and 184, respectively. The operation of the solvent stripper is such as to result in continuous vaporization of the solvent by mixing of the polymer solution in hot water while simultaneously steam distilling the solvent, thereby forming a slurry of the polymer crumb in water, and having a pH of 12. In the embodiment shown, the polymer crumb is in the form of discrete, well-formed, hard particles, due to the presence of the surfactant, and overflows at the liquid operating level of the solvent stripper 180, which may be adjusted to provide the retention time required to completely remove the solvent. The crumb is withdrawn through overflow pipe 188 to a screening operation.

The crumb-water slurry passing through overflow pipe 188 is sent to product screen tank 190 into which wash water is also passed through line 192. The water is withdrawn from tank 190 via line 196, and part is recycled to the solvent stripper 180 and part is purged. The washed polymer crumb is removed from the screen tank 190, and may then be passed through subsequent stages such as drying, milling and packaging.

The amount of solvent used in the process of the invention is considerable, and obviously such quantity of solvent cannot be lost and still maintain an economically feasible operation. Accordingly, solvent distilled from solvent stripper 180 and containing some water is passed through line 200 and condenser 202 to the solvent-water separator 204. In this separator the heavier water phase settles to the bottom and is passed through line 208 to waste, while the solvent liquid is passed through line 210 to storage tank 212, and thence fed by pump 214 to a distillation drying column.

The light ends (waxes and solvent) are withdrawn overhead via line 220 to a condenser 221, where they are liquefied, and the noncondensibles including monomer are withdrawn via line 219. Butadiene and in some cases isoprene are recovered and recycled. The condensed liquid is run via line 222 into decanter 223, where the water is separated, and solvent is returned via line 224 to the column 216. The solvent liquid is withdrawn at the bottom of the column via line 205 and run via pump 207 to the heavy ends removal column 213.

The heavy ends are withdrawn at the bottom of the column 213, and styrene if present is recovered and recycled; the remainder is discarded. The dry light solvent ends are condensed in condenser 215 and thence led via line 217 to the dry solvent storage tank 218, after which they are recycled to the solvent feed tank 122 via line 225.

The washing system provides a simple, efficient and highly flexible process for removing water-soluble components from the organic streams encountered in the continuous alfin polymerization process of this invention. Obviously, where the end use of a polymer is such as not to require substantial absence of ash, the entire washing operation may be omitted from the process, and polymer solution passed directly from the reactors to the desolventizing operation.

The washing method of this invention achieves intimate contact of the organic polymer phase with the aqueous phase by feeding of the organic polymer phase and the aqueous phase into a central zone from which the streams are centrifugally impelled radially outwardly at high speed against a peripheral collection zone surrounding the said central zone. The streams are thus converted to an emulsion by the violent radially impelling force and then delivered as a single stream to a discharge zone, and divided into two portions, one of which is recirculated to the central zone for further mixing with fresh feed, while the other portion in emulsion form is passed to a decanting area for separation in the manner described above.

Water is conserved by providing for two or more of the just described washing systems in series. In this embodiment the emulsion formed by the radially impelling force in a first zone is divided into two streams, one of which is recirculated to the central zone for further mixing. The second stream is decanted and the partially washed organic phase is used as the feed for a second stage operation to be intimately contacted with fresh water. The decanted aqueous phase from this second stage is used as the wash liquid for crude organic phase in the first stage.

In contrast to the prior art polymer washing methods using stirred-tank washing means and requiring mixing periods of one-half hour to several hours, the instant washing method requires a mixing time on the order of seconds. Moreover, in many cases, the present washing method obviates the need for catalyst deactivation, polymer precipitation and the addition of emulsion-breaking agents before decantation, which steps are generally required in prior art methods.

The following examples in the opinion of the inventors represent preferred embodiments of their invention.

Example 1

A butadiene-isoprene copolymer was prepared in accordance with the following procedure.

Liquid sodium (400 lbs.) at approximately 240° F. was charged to the sodium dispersion preparation tank 5, and 1200 pounds of isooctane run in from storage 14 via line 3 under a pressure of 35 p.s.i.g., whereupon the sodium was dispersed therein at 240° F. via the Gaulin mill 8 to form a uniform dispersion.

An alfin catalyst was prepared by charging 1950 pounds isooctane to the catalyst synthesis reactor 16, after which 550 pounds of the sodium dispersion and 120 pounds of isopropyl alcohol were added with agitation and cooling to maintain approximately 150° F. The alcohol was added over a three hour period. One-third of the sodium was thereby converted to sodium isopropoxide. Then, over a five hour period 190 pounds of butyl chloride was added, converting most of the remaining sodium to equimolar quantities of sodium butyl and sodium chloride. After addition of the butyl chloride was complete, the reaction was completed by stirring for a further hour.

Next, 95 pounds of propylene was added, converting sodium butyl to sodium allyl, with the formation of butane as a byproduct. This was retained in the system.

Catalyst thus prepared was fed to the first reactor 31 via line 23 at a rate of 240 pounds per hour. Dry butadiene was charged continuously via lines 24, 33 at a rate of 480 pounds per hour, and dry isoprene via lines 26, 33 amounting to 120 pounds per hour. 1,4-dihydronaphthalene was added as a moderator at a rate of 3.5 pounds per hour, and isooctane was added at a rate of 4260 pounds per hour. All of the streams were fed in at approximately 100° F.

The six reactors 31, 31' were cooled by water at 85° F., so as to maintain a reaction temperature of 150 to 160° F. in each of the reactors, which were operated liquid full. The pressure in the reactors was 50 p.s.i.g. The reaction mixture was fed in sequence from reactor to reactor, and the total travel and reaction time through the entire series of six was five hours.

The polymerizer effluent containing 10 weight percent alfin rubber at 150° F., was passed to the tank 39 where it was blended with 0.25% Tamol SN (sodium poly-(methylene naphthalene) sulfonate), and then was fed in line 40 at a rate of 5100 pounds per hour to the first solvent stripper 41, where it was blended with two and one-half times its volume of hot water at 190° F. Steam at a rate of 10 lbs./lb. was injected to heat the suspension to a temperature of 212° F. while the mixture was intensely agitated. The isooctane flashed off, together with butadiene, isoprene, isopropanol, and propylene. Approximately 95% of the total solvent was removed in the first stripper. The vapor streams in line 42 amounted to approximately 4100 pounds per hour. Isooctane and butadiene and isoprene were dried, condensed, separated in the fractionator 43, and recycled. Butadiene dimer was removed in the heavy ends column 70, and was purged.

A 5 weight percent rubber crumb in water, pH12, resulted. The crumb was in the form of hard, discrete particles, which showed no tendency to stick to each other or to the equipment. The crumb was drawn off at the bottom of the stripper 41 via line 48, and was sent to the second stage solvent stripper or crumb former 41', where the steam distillation was repeated. The solvent content of the crumb at the beginning of this stage was approximately 10 weight percent, based on the rubber content. The aqueous slurry of rubber emerging from this crumb former had the solvent content reduced to 1 weight percent, and a pH of 12.5. The vapor stream in line 42 contained essentially all of the hydrocarbons originally present with the crumb, and in addition propylene and isopropyl alcohol formed by hydrolysis of the catalyst. The rubber crumb contained only small amounts of molecular weight moderator and solvent.

The crumb slurry from the solvent stripper 41' passed through the screen separator 52, removing rubber crumb which floated to the surface of the vessel. The liquid in the lower portion was recycled to the first crumb former 41.

The rubber crumb in the form of small, hard particles containing approximately 60 weight percent water was raked off, and entered the dewatering screen 56, where it was contacted with a stream of cold water at a rate of approximately 13 gallons per minute. This cooled the crumb, prevented clogging of the screen, and reduced salt content. The underflow, consisting of water and a small amount of rubber fines, was pumped to the fines settler 55, where the rubber crumb overflowed from the upper portion of the vessel back on to the screen 56. The underflow was purged. The rubber crumb discharged from the screen was fed by the conveyor 60 to the expeller 61, which reduced the water content by screw compression from 60% to approximately 9%. The rubber crumb then entered the expander 64 where, by compression at several hundred p.s.i., the rubber was heated to approximately 330° F., so that upon discharge from the expander, water as steam and solvent flashed off. The product was then baled in the baler 67, and was ready for distribution. The product had a molecular weight of approximately 200,000, Mooney value 50.

Example 2

Utilizing equipment of the nature disclosed in FIG. 2, start-up was begun by feeding monomer, moderator, and solvent to the mixing tank 119. When this had overflowed into the first reactor 116, catalyst feed was begun, utilizing an alfin catalyst slurry in isooctane containing sodium isopropoxide, sodium allyl and sodium chloride, prepared as an Example 1.

Butadiene and isoprene or styrene feeds were at the rates shown in the table which follows. 1,4-dihydronaphthalene was utilized as the molecular weight moderator, and fed to the first reactor at the rate shown, to yield a polymer with the Mooney value at from 75 to 90. Additional isooctane was added so that the final concentration of alfin polymer would be about 8 to 8.5 percent. When reactor 116 was liquid-full, solution began to flow into the second reactor 126 and when this reactor was full, material overflowed into the third reactor 127, and then into the last reactor 128. Agitation in the mixing tank 119 was maintained at 150 r.p.m. and in all the reactors it was maintained at 200 r.p.m. When two of the tanks 172 were at operating level, the product recovery system was started.

A solution was formed of Tamol SN (sodium salt of poly(methylene naphthalene)sulfonate) in the hot water fed into the steam stripper 180, sufficient to provide 0.25% Tamol SN by weight of the alfin polymer. A hard, small-particle crumb resulted.

Operating for varying days and periods of time each day, preparing butadiene-styrene and butadiene-isoprene copolymers, the conditions and results as shown in the following Tables I and II were obtained.

TABLE I.—PRODUCTION SUMMARY DATA—80% BUTADIENE-20% ISOPRENE

| Day | 1 | 2 | 3 | 4 | 5 | Total |
|---|---|---|---|---|---|---|
| Hour on stream | 22.0 | 24.0 | 24.0 | 24.0 | 17.0 | 111.0 |
| Butadiene fed, lbs | 272 | 281 | 278 | 278 | 214 | 1323 |
| Average feed rate, lbs./hr | 12.34 | 11.72 | 11.58 | 11.58 | 12.60 | 11.91 |
| Isoprene fed, lbs | 73.2 | 68.4 | 75.2 | 70.4 | 54.0 | 341 |
| Average feed rate, lbs./hr | 3.33 | 2.85 | 3.13 | 2.93 | 3.17 | 3.07 |
| Total monomers fed, lbs | 345 | 350 | 353 | 348 | 268 | 1664 |
| Average feed rate, lbs./hr | 15.7 | 14.6 | 14.7 | 14.5 | 15.8 | 15.0 |
| Butadiene-isoprene ratio | 78.8:21.3 | 80.4:19.6 | 78.7:21.3 | 79.8:20.2 | 79.9:20.1 | 79.5:20.5 |
| Catalyst fed, lbs | 110 | 138 | 152 | 136 | 112 | 648 |
| Average feed rate, lbs./hr | 5.00 | 5.75 | 6.34 | 5.67 | 6.57 | 5.84 |
| Average lbs. catalyst/lb. monomer | 0.37 | 0.39 | 0.43 | 0.39 | 0.42 | 0.39 |
| 1,4-dihydronaphthalene fed, lbs | 0.92 | 0.92 | 1.02 | 0.92 | 0.58 | 4.36 |
| Average feed rate, lbs./hr | 0.042 | 0.038 | 0.042 | 0.038 | 0.034 | 0.039 |
| Average lbs. 1,4-dihydronaphthalene/lb. monomer | 0.0031 | 0.0026 | 0.0029 | 0.0026 | 0.0022 | 0.0026 |
| Isooctane C fed, lbs | 3195 | 3466 | 3737 | 3554 | 2581 | 16,533 |
| Average feed rate, lbs./hr | 145 | 144 | 156 | 148 | 152 | 149 |
| Total feed to reactors, lbs | 3572 | 3856 | 4134 | 3942 | 2881 | 18,386 |
| Monomers fed, percent of total feed | 8.25 | 9.07 | 8.54 | 8.83 | 9.31 | 9.05 |
| Average reactor temperature, °F.: | | | | | | |
| No. 1 | 91 | 91 | 91 | 90 | 91 | 91 |
| No. 2 | 128 | 134 | 134 | 132 | 135 | 135 |
| No. 3 | 126 | 135 | 133 | 131 | 134 | 132 |
| No. 4 | 126 | 137 | 135 | 133 | 137 | 134 |
| No. 5 | 108 | 118 | 114 | 111 | 115 | 113 |
| Rubber recovered, lbs | | | | | | 1433 |
| Yield, percent | | | | | | 66.1 |
| Mooney range | | | | | | 75.90 |

TABLE II.—PRODUCTION SUMMARY DATA—85% BUTADIENE-15% STYRENE

| Day | 1 | 2 | 3 | 4 | 5(6) | Total |
|---|---|---|---|---|---|---|
| Hours on stream | 22.6 | 22.5 | 24.0 | 20.7 | 28.0 | 117.8 |
| Butadiene fed, lbs | 254 | 262 | 292 | 251 | 318 | 1377 |
| Average feed rate, lbs./hr | 11.25 | 11.64 | 12.15 | 12.15 | 11.37 | 11.69 |
| Styrene fed, lbs | 43.8 | 43.9 | 46.0 | 38.6 | 50.1 | 222.4 |
| Average feed rate, lbs./hr | 1.94 | 1.95 | 1.92 | 1.87 | 1.79 | 1.89 |
| Total monomers fed, lbs | 298 | 306 | 337 | 289 | 368 | 1,599 |
| Average feed rate, lbs./hr | 13.19 | 13.59 | 14.07 | 14.02 | 13.16 | 13.58 |
| Butadiene-styrene ratio | 85.3:14.7 | 85.7:14.3 | 86.4:13.6 | 86.7:13.3 | 86.4:13.6 | 86.1:13.9 |
| Catalyst fed, lbs | 107 | 112 | 130 | 132 | 134 | 615 |
| Average feed rate, lbs./hr | 4.73 | 4.97 | 5.43 | 6.39 | 4.78 | 5.23 |
| Average lbs. catalyst/lb. monomer | 0.36 | 0.37 | 0.39 | 0.46 | 0.36 | 0.38 |
| 1,4-dihydronaphthalene fed, lbs | 2.27 | 2.57 | 2.62 | 2.42 | 3.15 | 13.03 |
| Average feed rate, lbs./hr | 0.10 | 0.11 | 0.11 | 0.12 | 0.11 | 0.11 |
| Average lbs. 1,4-dihydronaphthalene/lbs. monomer | 0.0076 | 0.0084 | 0.0078 | 0.0084 | 0.0085 | 0.0081 |
| Isooctane fed, lbs | 2923 | 2895 | 2911 | 2436 | 3085 | 14,249 |
| Average feed rate, lb./hr | 129 | 129 | 121 | 118 | 110 | 121 |
| Total feed to reactors, lb | 3253 | 3235 | 3288 | 2766 | 3495 | 16,036 |
| Monomers fed, percent of total feed | 9.16 | 9.45 | 10.26 | 10.48 | 10.50 | 9.97 |
| Average reactor temperature °F.: | | | | | | |
| No. 1 | 82 | 82 | 82 | 81 | 85 | 83 |
| No. 2 | 132 | 134 | 128 | 129 | 133 | 131 |
| No. 3 | 129 | 134 | 134 | 132 | 138 | 134 |
| No. 4 | 124 | 130 | 132 | 128 | 136 | 130 |
| No. 5 | 117 | 116 | 117 | 116 | 119 | 117 |
| Rubber recovered, lbs | | | | | | 1400 |
| Yield, percent | | | | | | 87.5 |
| Mooney range | | | | | | 60-65 |

Having regard to the foregoing disclosure, the following is claimed as the inventive and patentable embodiments thereof:

1. In the continuous process for the preparation of alfin polymers from alfin monomers, comprising continuously blending an organic unsaturated alfin monomer, alfin catalyst, molecular weight moderator and solvent, to form a reaction mixture substantially free from polyvalent metal cations, continuously effecting the polymerization of alfin monomer at an elevated temperature at which the reaction proceeds while controlling molecular weight by adjusting the amount of molecular weight moderator, continuously separating volatile materials including unreacted monomer, volatile low polymer, and solvent from the alfin polymer reaction mixture by quenching the reaction mixture in water, and steam distilling such volatile materials from the resulting dispersion, thereby forming an alfin polymer crumb slurry in water, the improvement which comprises forming a crumb slurry substantially free from polyvalent metal cations, in the presence of from about 0.05 to about 2% by weight of an alkali metal salt of an anionic poly(alkylene naphthalene) sulfonate, the alkylene having from one to four carbon atoms, and thereafter recovering solvent and, if desired, monomer, for reuse, and washing and drying the alfin polymer.

2. The process of claim 1, wherein the anionic surfactant is alkali metal poly(methylene naphthalene) sulfonate.

3. The process of claim 1, wherein the molecular weight of the polymer is controlled solely by adjustment of the proportion of molecular weight moderator, while maintaining reaction conditions, proportion of catalyst, and other process variables relatively constant.

4. The process of claim 1 wherein the polymerization is effected at a temperature within the range from about 40 to about 200° F.

5. The process of claim 1 wherein the alfin catalyst is sodium allyl-sodium isopropoxide-sodium chloride.

6. The process of claim 1 wherein the molecular weight moderator is a dihydroaromatic component.

7. The process of claim 1 wherein the dihydroaromatic component is a dihydronaphthalene.

8. The process of claim 1 wherein the monomer is butadiene.

9. The process of claim 1 wherein the monomer is isoprene.

10. The process of claim 1 wherein the monomers are butadiene and isoprene.

11. The process of claim 1 wherein the monomers are butadiene and styrene.

12. The process of claim 1 wherein the steam-distillation is carried out at a temperature within the range from about 80 to about 120° C.

13. The process of claim 1 wherein the alfin catalyst and sodium dispersion used for making the alfin catalyst are prepared in the same solvent employed for the alfin monomer polymerization reaction, and solvent is recycled to all three steps.

14. The process of claim 1 wherein the moderator is in an amount within the range from about 0.1 to about 10%.

15. The process of claim 1 wherein the amount of monomer employed is calculated to give an alfin polymer concentration in the reaction solution within the range from about 2 to about 15 weight percent.

16. A process in accordance with claim 1 in which an alfin polymer is produced of from about 20 to about 150 Mooney.

17. A process in accordance with claim 1 in which volatiles are removed by quenching in hot water at from about 80 to about 120° C.

18. A continuous process in accordance with claim 1, comprising continuously blending an organic unsaturated alfin monomer, alfin catalyst, molecular weight moderator and solvent and continuously passing the blend through a reaction zone while effecting the polymerization of alfin monomer at an elevated temperature at which the reaction proceeds while controlling molecular weight by the selected amount of molecular weight moderator, withdrawing from the reaction zone alfin polymer-containing reaction mixture having a Mooney of at least 70% of the desired Mooney and an alfin polymer concentration of from about 2 to about 15 weight percent, continuously quenching the reaction mixture by blending it with water containing an anionic poly(alkylene naphthalene) sulfonate surfactant, the alkylene having from one to four carbon atoms, and at a temperature of from about 80 to about 120° C., injecting steam into the reaction mixture, and hydrolyzing alfin catalyst and separating and recovering volatile materials including unreacted monomer, volatile low polymer, and solvent from the quenched alfin polymer reaction mixture, to form a crumb slurry having a pH of above about 10, separating and recovering monomer and solvent for reuse, and washing and drying the alfin rubber.

19. A process in accordance with claim 18 in which alfin catalyst is prepared in an inert solvent for use in the process, starting from sodium suspended in an inert solvent, methyl-n-alkyl carbinol and olefin, and such solvent, carbinol and olefin are also recovered in the steam distillation, and at least the solvent recycled.

20. A process in accordance with claim 18 in which the water is also recycled.

References Cited
UNITED STATES PATENTS

| | | | |
|---|---|---|---|
| 2,953,556 | 9/1960 | Wolfe et al. | 260—94.7 |
| 3,042,637 | 7/1962 | Crouch | 260—17.5 |
| 3,190,868 | 6/1965 | Mitacek et al. | 260—94.7 |
| 3,258,453 | 6/1966 | Chi | 260—82.1 |
| 3,268,501 | 8/1966 | Crouch et al. | 260—94.7 |
| 3,320,220 | 5/1967 | DiDrusco et al. | 260—80.5 |

JOSEPH L. SCHOFER, Primary Examiner

J. C. HAIGHT, Assistant Examiner

U.S. Cl. X.R.

260—80.7, 83.7, 94.2, 94.7, 85.1